United States Patent [19]

Lass

[11] 4,116,748

[45] Sep. 26, 1978

[54] DRY WALL TAPING MACHINE HAVING AN IMPROVED TAPE SHEAR

[75] Inventor: Harold M. Lass, San Jose, Calif.

[73] Assignee: Corban Industries, Inc., San Jose, Calif.

[21] Appl. No.: 793,081

[22] Filed: May 2, 1977

Related U.S. Application Data

[63] Continuation-in-part of Ser. No. 739,520, Nov. 8, 1976, abandoned.

[51] Int. Cl.[2] ........................ B32B 31/00; B44C 7/00; B26D 1/00; B26D 5/08

[52] U.S. Cl. ........................ 156/526; 83/199; 83/580; 83/596; 156/575

[58] Field of Search ................. 83/199, 580, 611, 595, 83/596; 156/526, 574, 575

[56] References Cited

U.S. PATENT DOCUMENTS

| | | | |
|---|---|---|---|
| 2,694,378 | 11/1954 | Schnaible | 156/578 |
| 3,116,195 | 12/1963 | Lathrop et al. | 156/575 |
| 3,980,046 | 9/1976 | Homan | 118/405 |

FOREIGN PATENT DOCUMENTS

| | | | |
|---|---|---|---|
| 23,722 | 9/1962 | German Democratic Rep. | 83/611 |
| 1,032,949 | 6/1966 | United Kingdom | 83/199 |

*Primary Examiner*—Douglas J. Drummond
*Attorney, Agent, or Firm*—Harry E. Aine; Harvey G. Lowhurst

[57] ABSTRACT

A hand-operated dry wall taping machine includes an elongated tubular main body portion, to be held by the operator, with a tape applicator head at the end adjacent the seam being taped. A supply reel of tape is carried from the tubular body. The applicator head includes a dry wall cement dispenser box, through which the dry wall tape is fed. Cement is dispensed onto the side of the tape which is to face the wall being taped. A rotary tape shear is disposed up-tape from the cement dispensing box. A hand actuated pneumatically operated cylinder actuates the rotary shear at the end of the seam being taped and advances a short length of tape through the cement dispensing box in readiness to commence taping of the next seam.

9 Claims, 8 Drawing Figures

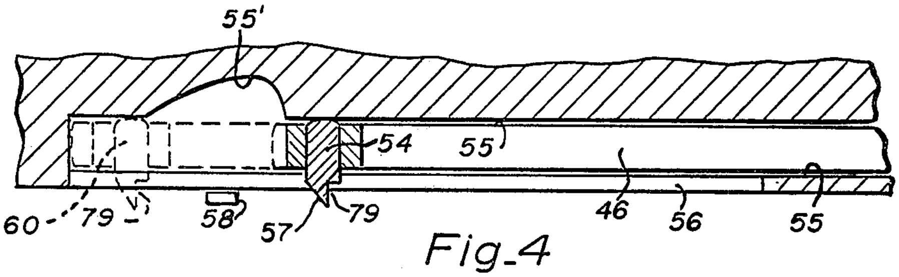
Fig_4
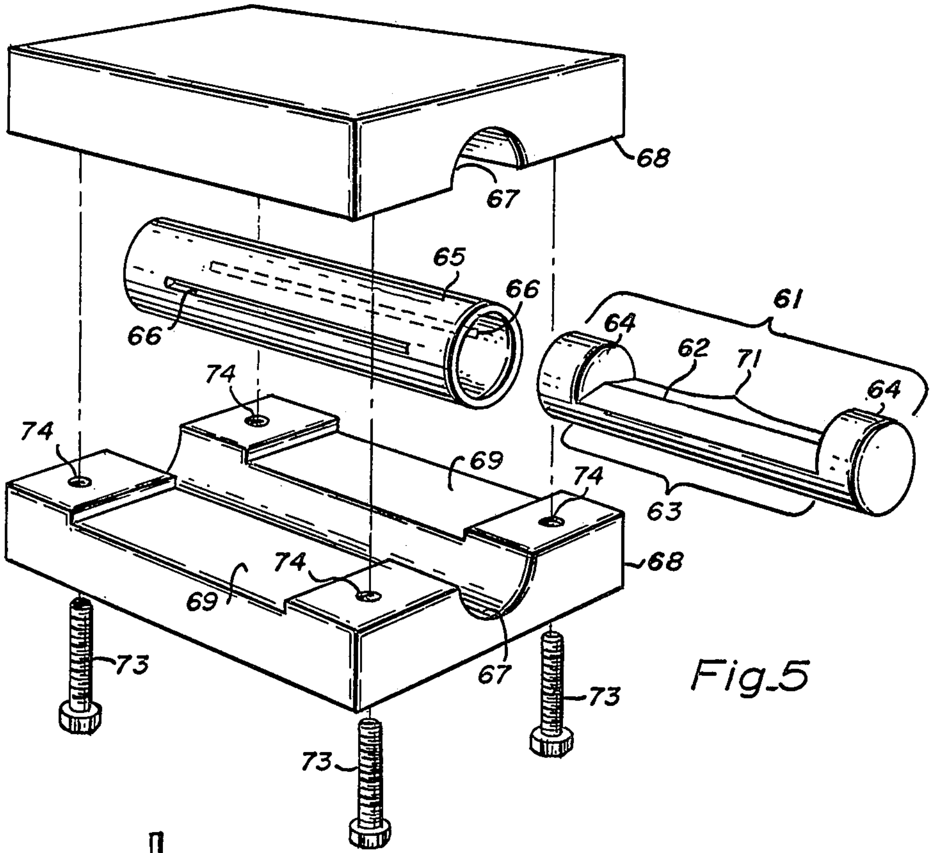
Fig_5
Fig_6
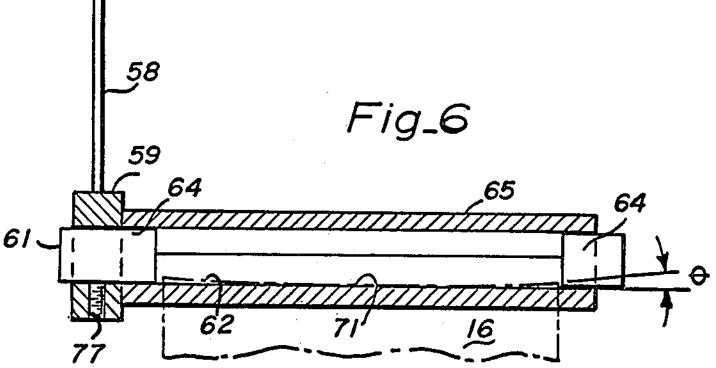

DRY WALL TAPING MACHINE HAVING AN IMPROVED TAPE SHEAR

RELATED CASES

The present application is a continuation-in-part of parent application U.S. Ser. No. 739,520 filed Nov. 8, 1976, now abandoned.

BACKGROUND OF THE INVENTION

The present invention relates in general to dry wall taping machines and more particularly to such a machine having an improved dry wall tape shear for shearing the tape at the end of the seam being taped.

DESCRIPTION OF THE PRIOR ART

Heretofore, dry wall taping machines have included tape shear devices for shearing the tape at the end of the seam being taped. These shears have generally been manually operated in that the operator, at the end of the seam being taped, pulls a lever which actuates the shear.

In one prior art device, as exemplified by U.S. Pat. No. 3,260,638 issued July 12, 1966, the shear comprises a knife blade which operates vertically in the manner of a guillotine which severs the cement laden tape after the tape has passed through the dry wall cement dispensing box. The problem with this arrangement is that the guillotine operates on a cement laden tape and has a tendency to become fouled due to the presence of the dry wall cement. In addition, the cement tends to dull the blade requiring frequent sharpening or replacement thereof.

In a second prior art device, as exemplified by U.S. Pat. No. 2,502,499 issued Apr. 4, 1950, the tape shear includes a knife blade which is caused to move laterally of the tape, thereby severing the tape in response to pulling of a lever which pulls a spring biased chain carrying the knife blade across the tape. In this device, the tape shear is disposed up-tape from the dry wall cement dispensing station so that the knife does not operate on the cement laden tape. However, in this arrangement the knife blades dull easily and have to be replaced quite often.

It is also known to employ a rotary shear structure for shearing package wrapping material as drawn from a supply roll. Such a rotary shear is disclosed in British Pat. No. 1,032,949 issued June 15, 1966.

SUMMARY OF THE PRESENT INVENTION

The principal object of the present invention is the provision of a dry wall taping machine having an improved tape shear.

In one feature of the present invention, the tape applicator head of the dry wall taping machine includes a rotary shear for shearing the tape at the end of the seam to be taped.

In another feature of the present invention, the rotary shear includes coaxially disposed shear members, one of the members being rotatable relative to the other and having a cutting edge portion extending laterally of the tape and being peaked intermediate the length of the tape so that when the rotary shear is actuated, shearing of the tape commences in a region of the tape intermediate the side edges thereof.

In another feature of the present invention the rotary shear structure includes a shear member comprising a tubular sleeve having a pair of axially directed diametrically opposed slot therein for passage of the tape therethrough.

In another feature of the present invention, the rotary shear structure includes a housing comprising a split block having a bore therein for clamping on opposite sides of at least one of the rotary shear members. One of the split block portions has a recess extending axially of and perpendicular to the bore with the recess portion intersecting with the bore for passage of the tape therethrough.

Other features and advantages of the present invention will become apparent upon a perusal of the following specification taken in connection with the accompanying drawings wherein:

BRIEF DESCRIPTION OF THE DRAWINGS

FIG. 4 is an enlarged detail view of a portion of the structure of FIG. 2 taken along line 4—4 in the direction of the arrows, FIG. 5 is an exploded perspective view of the paper shear and split-block portion of the structure of FIG. 2 delineated by line 5—5, FIG. 6 is an enlarged sectional view of a portion of the structure of FIG. 2 taken along line 6—6 and depicting the rotary shear structure in cross section.

DESCRIPTION OF THE PREFERRED EMBODIMENTS

Figure 1:
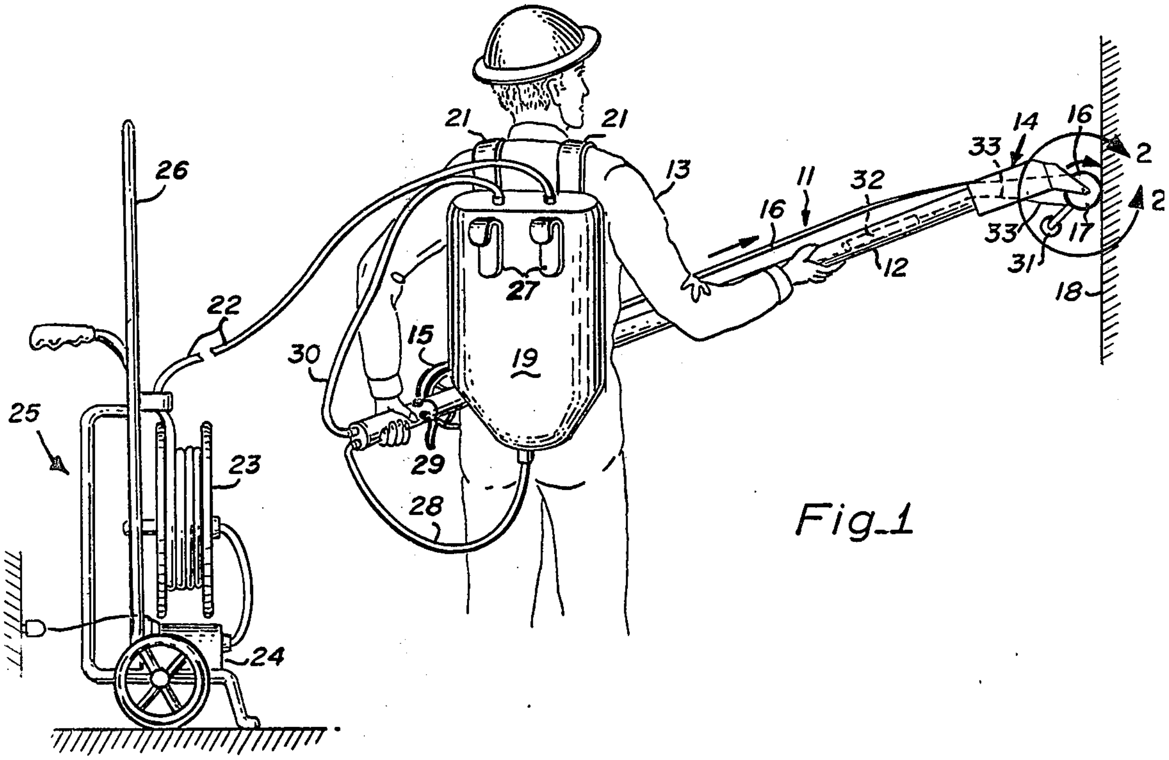
FIG. 1 is a side elevational view of a dry wall taping machine is use.
Figure 2:
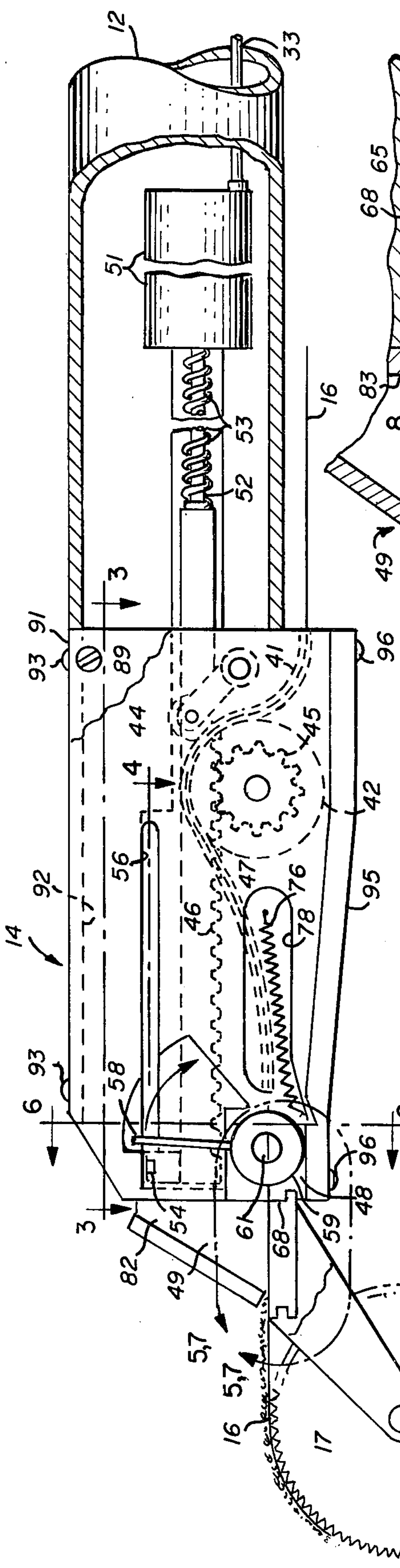
FIG. 2 is an enlarged detail view of a portion of the structure of FIG. 1 delineated by line 2—2 and partly broken away.

Referring now to FIG. 1, there is shown a dry wall taping tool 11 of the present invention. More particularly, the dry wall taping machine or tool 11 includes an elongated tubular body or barrel portion 12 to be handheld by the operator 13 so that an applicator head portion 14 of the tool 11 is disposed adjacent a seam which is to be taped between two adjoining sections of dry wall. A supply roll 15 of dry wall tape 16 is carried on a support pivotably affixed to the body or barrel 12. Tape 16 is fed from the roll through the applicator head portion 14 over a pair of tape drive wheels 17 which press the marginal edges of the tape 16 into engagement with the wall 18 and which in so doing serve to pull the tape 16 from the roll 15.

The tape 16 is drawn through a dry wall cement (mud) dispenser box portion of the head 14 wherein dry wall cement is dispensed onto the upper surface of the tape so that as the tape is applied to the wall 18, cement is trapped between the tape and the wall. A tape shear, disposed in the applicator head 14 and more fully disclosed below with regard to FIGS. 2–6, shears the tape upon completion of the taping of a given seam. The shear is actuated by the operator when the end of the seam being taped is reached.

The dry wall cement is supplied to the applicator head 14 from a tank 19 carried via shoulder straps 21 from the shoulder of the operator 13. The cement tank 19 contains a supply of dry wall cement and the tank is pressurized to a pressure of 35–40 psi via an air line 22 wound on a spring loaded supply reel 23 and thence connected to an air compressor 24 via a suitable pressure regulator, not shown. The compressor and supply reel are carried from a hand truck 25 which includes a vertically extendable frame member 26 to receive and support the tank, when not in use, via hooks 27 affixed to the tank and hooked over an upper horizontal cross member of the frame 26.

Dry wall cement is supplied from the tank 19 to the taping tool 11 via tubing 28. Suitable hand operated valves 29 are disposed at the outer end of the body 12 for operation by the thumb of the operator for controlling certain functions of the taping tool 11. One valve controls the flow of dry wall cement from the tank 19 to the applicator head 14. Another valve controls air pressure to a pneumatic cylinder for operating the shear and for advancing the leading end of the tape 16. Another valve controls air pressure to a second pneumatic cylinder 32 for operating a cornering wheel 31. The pneumatically operated cylinder 32 is mechanically coupled to the cornering wheel 31 via a cable 33 such that when the air pressure as supplied to the pneumatic cylinder 32 is relieved a spring mechanically associated with the cornering wheel 39, pivots the cornering wheel into the operating position where it remains so long as the operator depresses the pneumatic control valve for releasing the pressure on the cylinder 32. After the cornering wheel operation is completed, the operator releases the pneumatic control valve and reapplies the pressure to the cylinder 32, thereby withdrawing the cornering wheel via cable 33 against its spring pressure. After the tape has been applied to the wall, conventional finishing tools are employed for smoothing the tape 16 and removing the excess dry wall cement.

Referring now to FIGS. 2–6, the features of the tape shear for shearing the tape at the end of a seam, will be explained in greater detail. The tape 16 to be applied to the dry wall joint being taped is fed from the supply roll 15 through a guide 41 and over a tape feed drive roller 42. Three rubber O-rings 43 are coaxially mounted at the periphery of the roller 42 to provide a frictional contact with the tape 16. Spring loaded rollers 44 press the tape 16 into engagement with the O-rings 43. The feed roller 42 is coupled to a pinion gear 45 which is actuated by means of a rack 46 for frictionally driving the tape forward at the end of the tape shearing operation, to be more fully described below.

The tape 16 is fed via additional paper guides 47 through a shear housing 48 and thence through a dry wall cement dispensing box 49 wherein dry wall cement is applied to the upper surface of the tape. The cement laden tape then passes over the tape drive rollers 17 and onto the wall 18 being taped.

A hand actuated pneumatic tape shear cylinder 51 is contained within the tubular handle 12. The pneumatic cylinder 51 is supplied with air pressure from the air line 33 via one of the suitable control valves 29. The rack 46 is coupled to the drive shaft 52 of the pneumatic cylinder 51 and a compression spring 53 is coaxially mounted between the rack 46 and the pneumatic cylinder 51 for compression as the rack 46 is moved back toward the pneumatic cylinder 51. A pawl 54 (see FIG. 4) is carried at the end of the rack 46. The rack 46 slides to and fro in a bore 55 having a slot communicating through the side wall thereof at 56 through which the pawl 54 extends. As the rack moves forward in the bore 55 the pawl follows the contour of the wall 55 of the bore which is recessed at 55′. The pawl 54 includes an inclined forward face portion 57 which, upon engaging a rotary shear actuating lever 58 when moving forward, causes the pawl 54 to move over and follow the recessed contour of the bore at 55′ thereby passing by the shear actuating lever 58, such pawl 54 following the contour to a forwardmost position 60 as indicated by the dotted lines at the terminal ends of the forward stroke of the rack 46.

The shear actuating arm 58 (FIG. 6) is coupled at hub 59 to one end of a rotatable knife member 61, as of steel. The rotatable knife includes a sharpened blade portion 62 at the periphery of a cylindrical sector of the portion 63 of the knife 61. Opposite ends of the knife 61 include cylindrical bearing portions 64 which bear on the inside cylindrical surface of a cylindrical sleeve 65, as of steel. The steel sleeve 65 is axially slotted at diametrically opposed portions 66 for passage of the tape 16 therethrough. The knife 61 is coaxially disposed within the interior of the cylindrical sleeve 65 and the sleeve and knife assembly is held within a cylindrical bore 67 in a split block or housing 68, as of aluminum. The lower half of the split block housing 68 is recessed at 69 to provide a slot passing through the shear block assembly 68 for passage of the tape therethrough.

The tape passage 69 extends in a direction orthogonal to the axes of the rotary shear members 61 and 65. The slots 66 are disposed in registration with the rectangular slot 69 in the block 68 so as to provide a tape passage therethrough. In addition, the cylindrical sector 63 of the rotary knife 61 has an axial extent sufficient to accommodate the width of the tape 16.

The cutting edge 62 of the cylindrical sector 63 is peaked at 71 so that as the rotary knife blade or edge 62 shears the tape 16, by co-acting with the tubular shear member 65, the shearing action commences in the midplane of the tape 16 and propagates laterally thereof. The two sections 68 of the split block housing are held together by means of cap screws 73 passing through aligned bores 74 in the corners of the members 68 and terminating in tapped holes in the upper block member 68.

The shearing action is more clearly shown in FIG. 6 wherein the rotating knife 61 has a cutting edge 62 having a shear angle $\theta$ as indicated therein. The knife 61 as shown in FIG. 5, is turned end for end in the drawing relative to the other parts so as to better show the peaking 71 of the cutting edge 62. A tension spring 76 is coupled to a set screw 77 on the lever arm 58 and is carried within a recess 78 in the head 14 for spring biasing the lever arm in the counterclockwise direction. The side of the applicator head 14 is closed by a cover plate, not shown.

Figure 7:
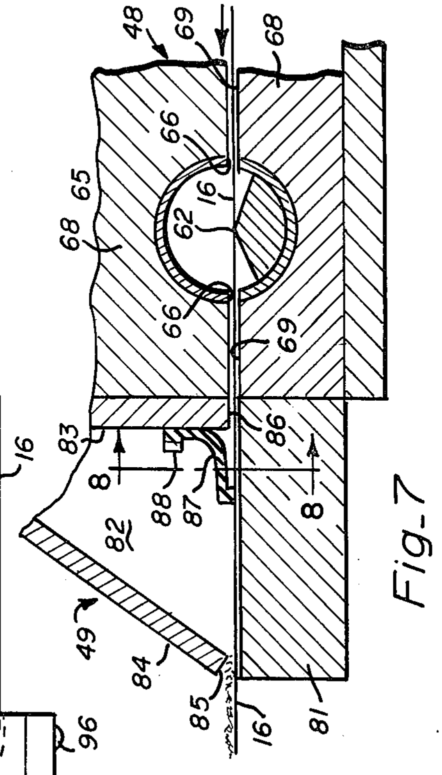
FIG. 7 is an enlarged cross sectional view of a portion of the structure of FIG. 2 delineated by line 7—7.
Figure 8:
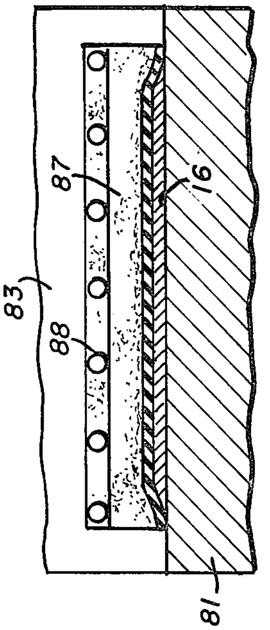
FIG. 8 is a cross sectional view of a portion of the structure of FIG. 7 taken along line 8—8 in the direction of the arrows.
Figure 3:
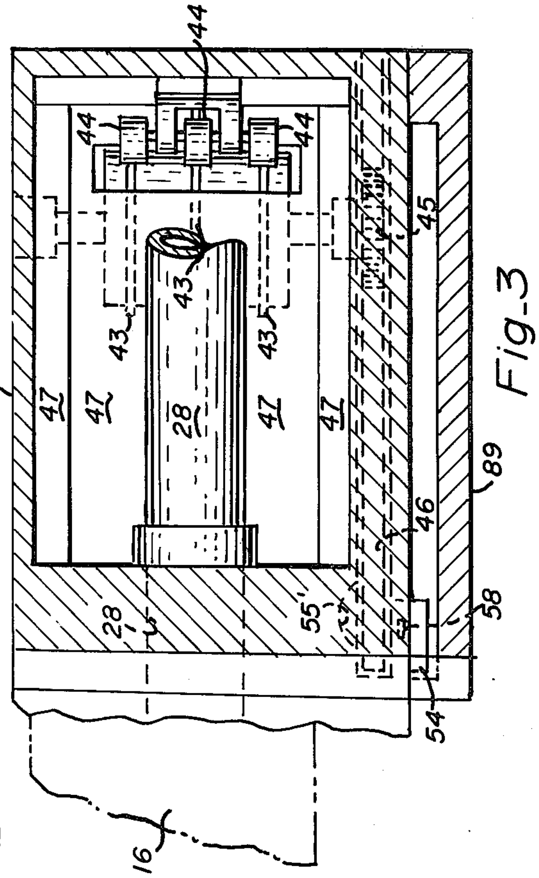
FIG. 3 is a plan view of a portion of the structure of FIG. 2 taken along line 3—3 in the direction of the arrows.

Referring now to FIGS. 7 and 8, the details of the mud dispensing box 49 is shown in greater detail. More particularly, the mud dispensing box 49 is disposed at the forwardmost wall of the rotary shear split block assembly 68. The mud dispensing box 49 includes a base plate portion 81, a pair of vertically directed side closing walls 82 disposed along the lateral side edges of the tape 16. In addition, the box 49 includes a rear wall 83 abutting the forward wall of the split block member 68 of the rotary shear. The rear wall 83 includes an opening passing therethrough, not shown, for supplying mud into the interior of the mud dispensing box 49 under pressure from the mud supply via hose or conduit 28.

The forward wall of the mud dispensing box 49 is closed off by means of an inclined plate 84, the lower lip of which at 85, defines a passageway through which the tape emerges from the cement dispensing box 49 and the height of the lower lip 85 over the base plate defines the height of a mud dispensing slot for leveling and controlling the thickness of the mud as deposited by the mud dispensing box 49 on the tape 16.

The back wall 83 of the mud dispensing box includes a rear slot 86 in alignment with slot 69 in the shear block 68 for passage of the tape 16 through the shear block 68 and thence through the back wall 83 of the mud dispensing box into the mud dispensing box and thence through the forward slot at 85 and over the tape drive wheels 17 and onto the wall 18. Rear slot 86 is sealed by means of a thin pliable flap 87 of material such as 0.005 inch thick Teflon sheet material captured to the back wall 83 of the mud dispensing box, internally thereof, via a batten 88. The flap 87 extends laterally past the lateral side edges of the tape and slot 86 for sealing the slot 86 to prevent passage of mud contained within the mud dispensing box 49 under pressure back along the tape 16 and into the rotary shear where it could harden and cause sticking of the shear as well as excessive wear of the shear. The flap seal 87 and pressurized mud box forms the subject matter of and is claimed in copending U.S. application Ser. No. 739,517 filed Nov. 8, 1976.

In addition to the mud sealing flap 87, the rotary shear structure is entirely enclosed within the head portion 14 so that mud, which drips from the wall or otherwise come into contact with the taping tool cannot fall upon the tape and be carried into the shear or can otherwise work its way into the shear structure. In this regard, a side cover plate 89 is fixedly secured as by screws 91 over one side of the head and is sealed thereto to prevent leakage of mud therethrough. The top of the head structure 14 is closed off by means of a second plate 92 similarly secured to the head via a plurality of screws 93. The other side of the housing, remote from plate 89, is closed off by means of a side wall 94 and the bottom of the head 14 is sealed off by means of a bottom plate 95 secured to the head 14 via screws 96. The rack and pinion gears as well as the bearings for the rotary shear and other rotatable structure within the head 14 is preferably lubricated by a waterproof grease.

In operation, the tape drive wheels 17 engage the marginal side edges of the cement laden tape 16 and as the applicator head 14 is moved upwardly along the seam in the wall to be taped, the serrated tape drive wheels 17 serve to pull the tape from the supply reel 15 through the applicator head 14 and dry wall cement dispensing box 49 in which cement is dispensed onto the upper surface of the tape. When the operator gets to the end of the seam which is being taped, he manually depresses one of the actuator valves 29, thereby applying air pressure via line 33 to the pneumatic cylinder 51. The pneumatic cylinder 51, prior to application of pressure thereto, is over-powered by the compression spring 53 so that the rack 46 is in the forwardmost position as indicated in FIG. 4 with the pawl 54 on the forward side of the lever arm 58. When the air pressure is applied to the pneumatic cylinder 51 the cylinder retracts the rack 46. In retracting the rack 46 the pawl 54 catches the lever arm 58 in a notch 79 of the pawl 54. As the rack retracts and the pawl 54 engages the lever 58, the lever is moved in a clockwise direction, thereby causing the rotary knife 61 to rotate in a clockwise direction severing the tape 16. During the severing step, the lever arm 58 rotates through approximately 70° of rotation. As the rack is moving rearwardly the pinion gear 45 is disconnected from the feed roller 42 via the intermediary of a spring clutch, not shown. The spring loaded rollers serve to prevent backward rotation of the feed roller 42.

After the tape 16 has been sheared and the rack 46 has retracted to its fully retracted position, the operator releases the air pressure from the pneumatic cylinder 51 by releasing the control button 29. This causes the compression spring 53 to return the rack 46 to its forwardmost position. During the return of the rack 46, the pinion gear 45 engages the feed roller 42 via the clutch causing the feed roller 42 to advance approximately 5½ inches of tape 16 through the shear block 68 and cement dispensing box 49 so that a leading end of the cement laden tape is ready to be pressed against the wall to begin taping of the next joint to be taped. After the tape 16 was sheared, the spring 76 returns the lever arm 58 and shear to the open position permitting the tape to advance through the shear block 68.

The advantage of the rotary shear of the present invention is that it is enclosed within an enclosure disposed up-tape from the dry wall cement dispensing box 49 and is sealed off from the mud box 49 via seal 87 such that the shear operates on the tape free of dry wall cement such that the shear is not fouled by the cement and such that the shear is not dulled by the cement. In addition, the peaked cutting edge on the shear serves to part the tape from the center thereby avoiding any tendency for the shear to move the tape transversely of its intended path through the shear end cement dispensing box 49. The cylindrical knife 61 provides a relatively rugged and sharp cutting edge which has much longer life than previous relatively thin cutting blades. As a result, blades do not have to be changed so often and the shear is not readily dulled. Thus maintenance of the shear is reduced.

While the preferred embodiment of the present invention utilizes a rotatably central knife with a stationary tubular shear member, this is not a requirement. If desired, the outer tubular member may rotate while the central knife is held fixed, or both may rotate in opposite directions.

What is claimed is:

1. In a dry wall taping machine for applying tape to elongated seams between adjacent sections of dry wall:

main body means to be grasped by the operator for movement along the seam by the operator and having an application portion for applying tape from a supply over the seam to be taped;

mud box means carried from said main body means to be supplied with mud under pressure for applying mud to that surface of the tape which is to face the wall being taped and having a tape entrance opening therein through which the tape is fed into said mud box means;

tape shear means disposed at a station up-tape from said mud box means for shearing the tape at the end of the seam, said tape shearing means including a rotary shear structure having first and second shearing members disposed for passage of the tape therethrough, said first shearing member having a cutting edge portion formed thereon and said second shearing member being rotatable relative to said first shearing member for shearing of the tape therebetween, said rotatable shearing members being disposed such that the axis of revolution of said rotatable member extends laterally of the longitudinal axis of the tape passing through said tape shearing means; and sealing means disposed down-tape from said shearing means for preventing travel of mud along the tape in the up-tape direction from said mud box means into said tape shearing means.

2. The apparatus of claim 1 including, enclosure means for enclosing said tape shearing means to prevent mud from entering said rotary shearing means, said enclosure means having a tape exit opening in alignment with said tape entrance opening in said mud box means so that the tape exiting from said tape shear means passes in alignment into said mud box means through said tape entrance opening.

3. The apparatus of claim 1 wherein said sealing means is disposed within said mud box means as a flexible flap structure extending across said tape entrance opening in said mud box means.

4. The apparatus of claim 1 wherein said cutting edge portion is elongated in a direction extending laterally of the tape and is peaked intermediate the length of said edge portions so that when said rotary shear structure is actuated for shearing of the tape, the shearing action commences in a region of the tape intermediate the side edges of the tape being sheared.

5. The apparatus of claim 1 wherein said cutting edge portion of said first tape shearing member is peaked so that shearing action commences generally in the midplane of the tape being sheared.

6. The apparatus of claim 1 wherein said first and second shearing members are coaxially disposed of each other.

7. The apparatus of claim 6 wherein said second shear member comprises a tubular sleeve having a pair of axially directed diametrically opposed slots therein for passage of the tape therethrough, and wherein said first shear member includes a sector of a cylinder having a cutting edge portion extending axially of said sector portion at the periphery thereof.

8. The apparatus of claim 1 including block means for housing said rotary shear structure, said block means including a bore therein for receiving at least one of said first and second shear members and being split axially of said bore for clamping on opposite sides of at least one of said shear members and having a recessed portion extending axially of and perpendicular to said bore, said recessed portion intersecting with said bore for passage of the tape therethrough.

9. In a dry wall taping machine for applying tape to elongated seams between adjacent sections of dry wall;

main body means to be grasped by the operator for movement along the seam by the operator and having an applicator portion for applying tape from a supply over the seam to be taped;

mud box means carried from said main body means to be supplied with mud under pressure for applying mud to that surface of the tape which is to face the wall being taped and having a tape entrance opening therein through which the tape is fed into said mud box means;

tape shear means disposed at a station up-tape from said mud box means for shearing the tape at the end of the seam, said tape shearing means including a rotary shear structure having first and second shearing members, said first shearing member having a cutting edge portion formed thereon and said second shearing member being rotatable relative to said first shearing member for shearing of the tape therebetween, said rotatable shearing members being disposed such that the axis of revolution of said rotatable member extends laterally of the longitudinal axis of the tape passing through said tape shearing means; and enclosure means for enclosing said tape shearing means to prevent mud from entering said rotary shearing means, said enclosure means having a tape exit opening in alignment with said tape entrance opening in said mud box means so that the tape exiting from said tape shear means passes in alignment into said mud box means through said tape entrance opening.

* * * * *